United States Patent [19]

McGregor

[11] Patent Number: 4,606,870

[45] Date of Patent: Aug. 19, 1986

[54] PREPARING MAGNET WIRE HAVING ELECTRON BEAM CURABLE WIRE ENAMELS

[75] Inventor: Charles W. McGregor, Fort Wayne, Ind.

[73] Assignee: Essex Group, Inc., Fort Wayne, Ind.

[21] Appl. No.: 764,810

[22] Filed: Aug. 12, 1985

Related U.S. Application Data

[62] Division of Ser. No. 634,341, Jul. 25, 1984.

[51] Int. Cl.⁴ ............................................. B29C 35/08
[52] U.S. Cl. ..................... 264/22; 264/25; 264/174; 264/236; 264/347; 427/120
[58] Field of Search .................. 264/22, 25, 174, 236, 264/347; 204/159.19; 427/117, 120

[56] References Cited

U.S. PATENT DOCUMENTS

| | | | |
|---|---|---|---|
| 4,000,362 | 12/1976 | Kawaguchi et al. | 174/120 R |
| 4,131,602 | 12/1978 | Hodakowski | 528/49 |
| 4,145,474 | 3/1979 | Kertscher et al. | 264/174 |
| 4,246,297 | 1/1981 | Nablo et al. | 427/44 |
| 4,269,947 | 5/1981 | Inata et al. | 264/22 |
| 4,361,799 | 11/1982 | Lutz | 338/26 |
| 4,379,102 | 4/1983 | Kertscher | 264/174 |
| 4,406,851 | 9/1985 | Janssen et al. | 264/174 |
| 4,521,173 | 6/1985 | Hilker et al. | 264/174 |
| 4,521,363 | 6/1985 | Vogel | 264/174 |
| 4,521,445 | 6/1985 | Nablo et al. | 264/22 |

*Primary Examiner*—Jeffery Thurlow
*Attorney, Agent, or Firm*—Harry J. Gwinnell

[57] ABSTRACT

An electron beam curable magnet wire enamel comprises the reaction product of a polyester prepolymer having terminal functional groups reactive with an isocyanate, and a urethane-acrylate prepolymer formed by reacting a diisocyanate and a hydroxyalkylacrylate. The resulting polymer is extrudable at 100% solids onto a magnet wire substrate and electron beam curable.

1 Claim, No Drawings

PREPARING MAGNET WIRE HAVING ELECTRON BEAM CURABLE WIRE ENAMELS

This is a division of copending application Ser. No. 634,341 filed on July 25, 1984.

DESCRIPTION

1. Technical Field

The field of art to which this invention pertains is electron beam curable polymers, and specifically electron beam curable magnet wire enamels.

2. Background Art

The magnet wire industry, although an old industry, is constantly in search of ways to improve both the insulation properties of the polymeric insulation applied to the magnet wire, and the methods of applying such polymers. Such efforts have included, for example, increasing the solids content of the polymer systems applied, to both reduce the amount of organic solvents utilized and increase the speed of application. And while radiation curing of such coating materials has been contemplated (note U.S. Pat. Nos. 4,000,362; 4,246,297; and 4,361,799) electron beam curable materials represent a relatively unchartered area in this art.

Accordingly, what is needed in this art are polymer systems which are electron beam curable and usable on magnet wire substrates.

DISCLOSURE OF INVENTION

The present invention is directed to a polymer system which is not only extrudable at 100% solids onto a magnet wire substrate but is also curable by electron beam radiation. The polymer is the reaction product of a polyester prepolymer having terminal functional groups reactive with an isocyanate, and a urethane-acrylate prepolymer formed by reacting a diisocyanate and a hydroxyalkylacrylate.

Another aspect of the invention is a method of making an insulated magnet wire by extrusion coating such polymer at 100% solids onto the magnet wire and curing with electron beam radiation.

Another aspect of the invention is a magnet wire so produced.

The foregoing and other features and advantages of the present invention will become more apparent from the following description.

BEST MODE FOR CARRYING OUT THE INVENTION

The polyester prepolymer can be any conventionally prepared or commercially available polyester with terminal functional groups reactive with an isocyanate, such as hydroxyl, carboxyl, etc. The prepolymer typically has the generic formula:

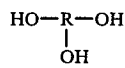

where R is a polyester prepolymer backbone such as prepared by the reaction of (a) a carboxyl containing component, e.g.,

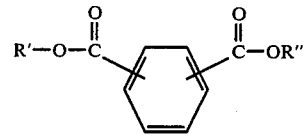

where R' and R" are the same or different and are selected from the group hydrogen and lower alkyl groups, such a methyl, ethyl, n-propyl, isopropyl and the like, and other aliphatic, cyclic and heterocyclic groups, and mixtures thereof, with (b) a hydroxyl compound.

While dimethyl terephthalate ester is preferred as the carboxyl containing material, any of a number of suitable carboxyl constituents can be used including terephthalic acid, isophthalic acid, and the lower alkyl esters of each, such as the diethyl esters, dipropyl esters, dibutyl esters, and anhydrides and mixtures of the foregoing and the like.

While ethylene glycol is preferred as the hydroxyl compound, any of a number of suitable diol or glycol constituents can be used including propanediols, butanediols, pentanediols, hexanediols, octanediols, and mixtures of the foregoing and the like. And while the dihydric alcohols are preferred, triols or higher polyols can be also be used such as trihydroxyethyl isocyanurate, glycerine, trimethylolethane, trimethyolpropane, 1,2,5 hexanetriol, polyether triol, mono-, di- and tri-pentaerythritol, and mixtures thereof.

It should be noted that while this invention is described in terms of a polyester prepolymer, other prepolymers having groups reactive with an isocyanate group may also be used such as polyurethanes; polyesterimides; carboxyl or anhydride terminated polyamides, polyimides, or polyamideimides; etc.

Once the polyester prepolymer is formed it is then reacted with the urethane-acrylate prepolymer. This prepolymer is formed by reacting a diisocyanate with an acrylate.

As the isocyanate component, any polyisocyanate with at least 2 isocyanate groups having the generic formula:

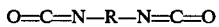

where R is an organic radical, may be used, such as:
tetramethylenediisocyanate
hexamethylenediisocyanate
1,4-phenylenediisocyanate
1,3-phenylenediisocyanate
1,4-cyclohexylenediisocyanate
2,4-tolylenediisocyanate
2,5-tolylenediisocyanate
2,6-tolylenediisocyanate
3,5-tolylenediisocyanate
4-chloro-1,3-phenylenediisocyanate
1-methoxy-2,4-phenylenediisocyanate
1-methyl-3,5-diethyl-b 2,6-phenylenediisocyanate
1,3,5-triethyl-2,4-phenylenediisocyanate
1-methyl-3,5-diethyl-2,4-phenylenediisocyanate
1-methyl-3,5-diethyl-6-chloro-2,4-phenylenediisocyanate
6-methyl-2,4-diethyl-5-nitro-1,3-phenylenediisocyanate
p-xylylenediisocyanate
m-xylylenediisocyanate
4,6-dimethyl-1,3-xylylenediisocianate 1,3-dimethyl-4,6-bis-(b-isocyanateoethyl)-benzene
3-(a-isocyanatoethyl)-phenylisocyanate
1-methyl-2,4-cyclohexylenediisocyanate 4,4'-biphenylenediisocyanate
3,3'-dimethyl-4,4'-biphenylenediisocyanate
3,3'-dimethoxy-4,4'-biphenylenediisocianate
3,3'diethoxy-4,4-biphenylenediisocyanate
1,1-bis-(4-isocyanatophenyl) cyclohexane
4,4'-diisocyanato-diphenylether
4,4'-diisocyanato-dicyclohexylmethane
4,4'-diisocyanato-diphenylmethane
4,4'-diisocyanato-3,3'-dimethyldiphenylmethane
4,4'-diisocyanato-3,3'-dichlorodiphenylmethane
4,4'-diisocyanato-diphenyldimethylmethane
1,5-naphthylenediisocyanate
1,4-naphthylenediisocyanate
4,4',4''-triisocyanato-triphenylmethane
2,4,4'-triisocyanato-diphenylether
2,4,6-triisocyanato-1-methyl-3,5-diethylbenzene
o-tolidine-4,4'-diisocyanato
m-tolidone-4,4'-diisocyanato
benzophenone-4,4'-diisocyanato
biuret triisocyanates
polymethylenepolyphenylene isocyanate The acrylic component should be sufficiently reactive to react with the isocyanate component without disturbing the ethylenic unsaturation provided by the acrylate. A particularly useful acrylate in this regard has the formula:

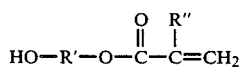

where R' and R'' can be an alkyl group such as methyl, ethyl, propyl, isopropyl, etc., and R'' can also be hydrogen. Hydroxypropyl acrylate and 2-hydroxyethyl acrylate are particularly preferred. Typical formation of the urethane-acrylate prepolymer is shown as follows:

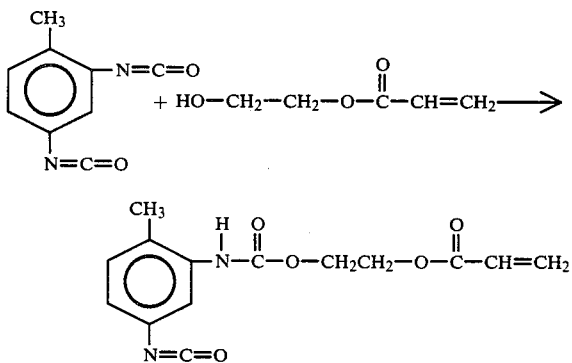

Sufficient stoichiometric amounts of acrylate should be reacted with the isocyanate to leave one isocyanate group unreacted.

The two prepolymers are then reacted, preferably at temperatures below 85° C. to preserve the ethylenic unsaturation. The relative amounts of the materials can be varied depending upon the amount of unsaturation desired to be incorporated into the resulting polymer. A typical polyester-urethane-acrylate reaction product is shown below where R is the polyester prepolymer backbone:

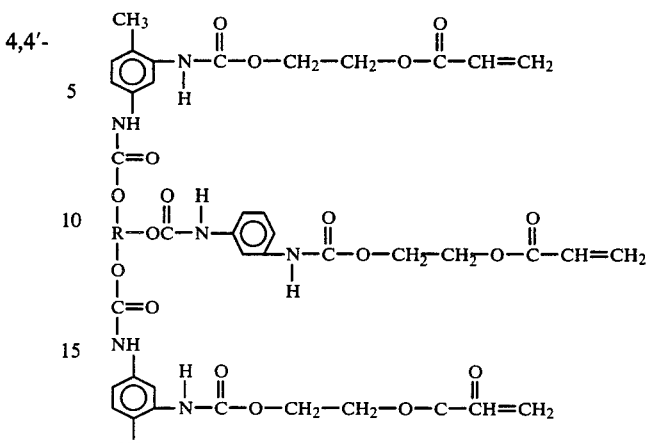

This reaction product is extrudable using standard extrusion equipment at 100% solids by heating to a temperature which provides an appropriate viscosity for extrusion. Typically this is a temperature below about 120° C. producing a viscosity under about 20,000 cps (centipoise) and preferably under 10,000 cps.

While the polymers according to the present invention can be used on any electrical conductor, they are preferably used on wires and specifically magnet wires. The wires are generally copper or aluminum. And wires ranging anywhere from 4 AWG to 30 AWG (American Wire Gauge) in diameter are coated, with 18 AWG being the most commonly coated wire. Wire coatings can be anywhere from 0.2-5 mils or any thickness desired, and preferably about 3.2 mils on 18 AWG wire. The polymer coat can be applied in a single coat or multiple coats with curing between coats. The coating can be used as a sole insulation coat or part of a multicoat system in combination with other conventional polymer insulation, such as polyesters, polyurethanes, polyvinyl formal, polyimides, etc., and combinations thereof. The polymer coatings of the present invention can also contain lubricants either externally on the coating, internally in the coating, or both.

The coatings can be applied using conventional extrusion equipment. Conventional, commercially available electron beam curing apparatus such as Electrocurtain ® apparatus (Energy Science, Inc.) can be used with the dosage varied depending on thickness of coating, amount of cross-linking desired etc. Typically doses up to about 60 megarads are used and preferably about 1 megarad to about 20 megarads.

EXAMPLE

An isocyanate-acrylate prepolymer was prepared as follows:

| Material | Moles | Equivalents | Grams | Weight Percent |
|---|---|---|---|---|
| Toluene diisocyanate | 4 | 8 | 696 | 60.00 |
| 2-hydroxyethyl acrylate | 4 | 4 | 464 | 39.998 |
| phenothiazene (double bond stabilizer) | | | 0.06 | 0.002 |

The toluene diisocyanate (TDI) and the phenothiazene were combined and heated up to 66° C. The 2-hydroxyalkylacrylate (HEA) was slowly added. The heat was turned off and the exothermic reaction was kept at 70° C. with a water bath. After all the HEA was added the temperature was allowed to rise to 75° C. The reaction temperature was maintained with external heating at 75° C. for approximately two and one-half hours. The viscosity (measured at 30° C.) eventually stabilized at X½.

A polyester prepolymer was prepared as folows:

| Material | Moles | Equiva-lents | Grams | Weight Percent |
|---|---|---|---|---|
| Phthalic anhydride | 2.5 | 5.00 | 370 | 51.11 |
| Trimethylol propane | 1.8 | 5.40 | 241 | 33.29 |
| Ethylene glycol | 1.8 | 3.60 | 112 | 15.47 |
| Tetrabutyl titanate (catalyst) | | | 1 | 0.13 |

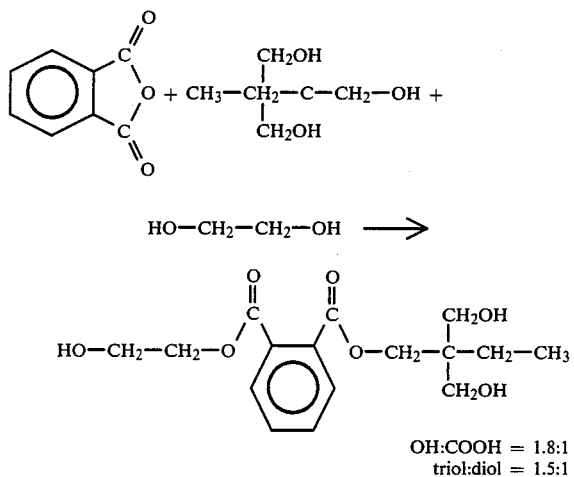

OH:COOH = 1.8:1
triol:diol = 1.5:1

The above ingredients were combined and heated under nitrogen gas over-pressure. The temperature rose gradually from 175° to 225° C. and water distillate collected until an acid number of 6 was obtained. Heating was discontinued and with a reaction kettle temperature of 190° C., a light vacuum was applied to strip off any residual water. The viscosity, at 60% solids in cresylic acid at 30° C. was Z1¾.

| Material | Moles | Equiva-lents | Grams | Weight Percent |
|---|---|---|---|---|
| Isocyanate-acrylate prepolymer | 2 | 2 | 338 | 36.8 |
| Polyester prepolymer | 2 | 2 | 580 | 63.2 |
| Phenothiazene | | | 0.04 | <0.1 |

The above materials were charged to a reaction vessel and heated to 40° C. under low nitrogen gas purge. The mixture became homogeneous with mixing. The temperature was raised to 65° C. and the heat source turned off. At this point the reaction showed signs of being exothermic with increasing viscosity. With the heat off, the temperature continued to rise to about 70° C. As the viscosity continued to rise and the temperature rose to 86° C., 2.1 grams (0.3% by weight) of hydroquinone was added to stabilize the doubled bonds with the increase in temperature. External temperature was added to decrease the viscosity allowing for better mixing. The temperature was allowed to rise to 95°. With the temperature at 106° C. a sample was taken which indicated that 98.6% of the isocyanate had reacted with the hydroxyl groups on the polyester. The resin material was then extruded through conventional extrusion dies at 100% solids and 100° C. onto an 18 AWG magnet wire substrate in a thickness of about 3 mils. The coated wire was then subjected to about 20 megarads of electron beam radiation. The resulting wire had good magnet wire insulating properties although did suffer somewhat in flex. (This could be altered by adjusting film build or applying supplemental base or topcoats such as thermoplastic material.)

Although this invention has been shown and described with respect to detailed embodiments thereof, it will be understood by those skilled in the art that various changes in form and detail thereof may be made without departing from the spirit and scope of the claimed invention.

I claim:

1. A method of coating a magnet wire substrate comprising applying to the magnet wire substrate through an extrusion die a 100% solids polymer composition comprising the reaction product of a polyester prepolymer having terminal functional groups reactive with an isocyanate, and a urethane-acrylate prepolymer formed by reacting a diisocyanate and a hydroxyalkylacrylate, the reaction product having the formula:

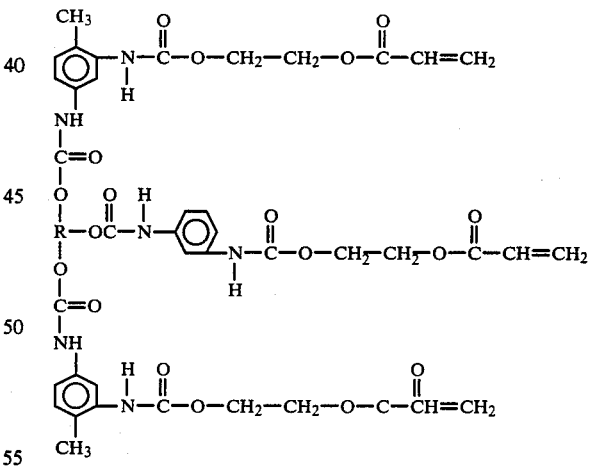

where R is a polyester backbone and curing the applied composition with electron beam radiation.

* * * * *

UNITED STATES PATENT AND TRADEMARK OFFICE
CERTIFICATE OF CORRECTION

PATENT NO. : 4,606,870
DATED : August 19, 1986
INVENTOR(S) : CHARLES W. McGREGOR It is certified that error appears in the above-identified patent and that said Letters Patent is hereby corrected as shown below:

Column 4, lines 1-19, and Column 6, lines 36-55, the formula should read:

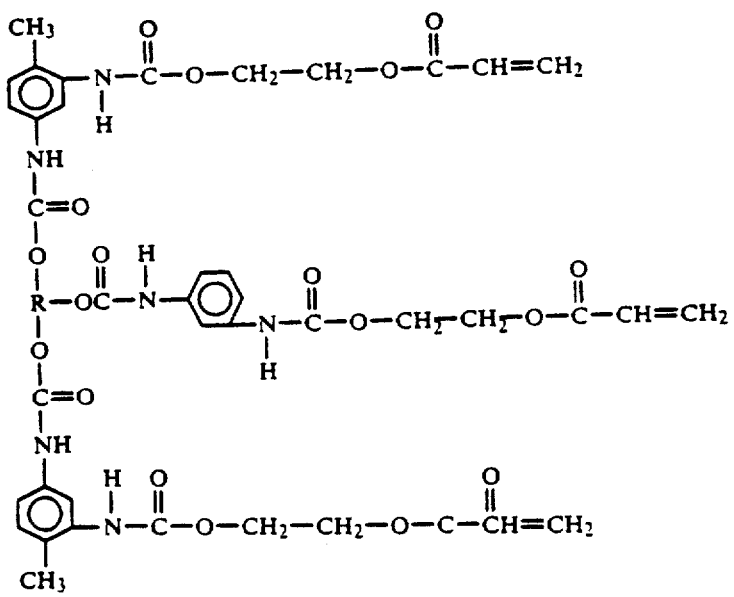

Column 5, lines 20-24, the formula should read:

UNITED STATES PATENT AND TRADEMARK OFFICE
CERTIFICATE OF CORRECTION

Page 2 of 2

PATENT NO. : 4,606,870
DATED : August 19, 1986
INVENTOR(S) : Charles W. McGregor It is certified that error appears in the above-identified patent and that said Letters Patent is hereby corrected as shown below:

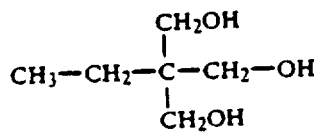

Signed and Sealed this

Twenty-fourth Day of March, 1987

Attest:

DONALD J. QUIGG

Attesting Officer

Commissioner of Patents and Trademarks